United States Patent [19]

Schmitkons et al.

[11] Patent Number: 5,332,125
[45] Date of Patent: Jul. 26, 1994

[54] METHOD & APPARATUS FOR METERING FLOW OF A TWO-COMPONENT DISPENSING SYSTEM

[75] Inventors: James W. Schmitkons, Lorain; Jeffrey Noss, Bay Village, both of Ohio

[73] Assignee: Nordson Corporation, Westlake, Ohio

[21] Appl. No.: 943,105

[22] Filed: Sep. 10, 1992

Related U.S. Application Data

[63] Continuation of Ser. No. 640,060, Jan. 11, 1991, abandoned.

[51] Int. Cl.$^5$ .............................................. B67D 5/00
[52] U.S. Cl. ............................................ 222/1; 222/54; 222/55; 222/63; 222/135; 222/145; 222/146.2; 222/146.5
[58] Field of Search ................. 222/135, 145, 129, 63, 222/55, 54, 52, 146.2, 146.5, 1

[56] References Cited

U.S. PATENT DOCUMENTS

| | | | |
|---|---|---|---|
| 3,786,990 | 1/1974 | Hagfors | 239/112 |
| 3,964,645 | 6/1976 | Scholl | 222/146.5 |
| 4,019,653 | 4/1977 | Scherer et al. | 222/1 |
| 4,073,409 | 2/1978 | Gardner et al. | 222/146.5 |
| 4,200,207 | 4/1980 | Akers et al. | 222/190 |
| 4,341,327 | 7/1982 | Zeitz | 222/135 X |
| 4,493,286 | 1/1985 | Carson | 222/135 X |
| 4,522,504 | 6/1985 | Greverath | 366/339 |
| 4,548,652 | 10/1985 | Kelly et al. | 134/22.12 |
| 4,703,894 | 11/1987 | Fukuta et al. | 239/414 |
| 4,850,514 | 7/1989 | Scholl et al. | 222/146.5 |
| 5,005,765 | 4/1991 | Kistner | 222/135 X |
| 5,162,121 | 11/1992 | Kawaguchi et al. | |

FOREIGN PATENT DOCUMENTS

| | | |
|---|---|---|
| 0025871 | 4/1981 | European Pat. Off. . |
| 0233519 | 5/1987 | European Pat. Off. . |
| 0374300 | 6/1990 | European Pat. Off. . |
| 0473424 | 3/1992 | European Pat. Off. . |
| 2626501 | 4/1989 | France . |
| 9110551 | 7/1991 | PCT Int'l Appl. . |
| 2163360 | 2/1986 | United Kingdom . |

OTHER PUBLICATIONS

369 Plastics Engineering: pp. 33–35, Machinery, Nov. 1983: "Exacting RIM process controls help yield higher-quality plastic parts".

"Reactive Hot Melt Adhesives Developed By H. B. Fuller Company", 1 p. Newsletter, Jun. 21, 1990.

An excerpt from *Chemical Marketing Reporter,* Aug. 27, 1990, SR 19.

*Primary Examiner*—David H. Bollinger
*Attorney, Agent, or Firm*—Wood, Herron & Evans

[57] ABSTRACT

A method and apparatus for mixing and dispensing two different polymeric materials which react chemically with one another when combined by supplying each material to a common dispenser where the materials are mixed and dispensed, which method and apparatus is operative to maintain substantially steady state flow pressures of the materials at the inlets to the dispenser when flow is terminated such that upon restarting of the flow, the steady state volumetric ratio of materials is immediately reestablished and maintained. The method and apparatus includes two metering pumps for individually supplying the liquid materials to the dispenser and means for varying the speeds of the pumps in response to changes in temperature of the materials so as to maintain a fixed mass ratio of the materials to the dispenser.

34 Claims, 2 Drawing Sheets

METHOD & APPARATUS FOR METERING FLOW OF A TWO-COMPONENT DISPENSING SYSTEM

This application is a continuation of application Ser. No. 640,060, filed Jan. 11, 1991.

FIELD OF THE INVENTION

This invention relates to two-component mixing and dispensing systems and, more particularly, to such systems for mixing and dispensing two different polymeric materials which react chemically with one another when combined.

BACKGROUND OF THE INVENTION

Two-component polymeric materials such as reactive adhesives, paints, gasket materials, and caulking materials comprise two separate components which react chemically with one another when intermixed. For example, two-component hot melt polymeric materials used in adhesive applications include a polymeric material and a second material such as a hardener. These types of hot melt adhesives, and other two-component polymeric materials, are dispensed from a system in which the two components are supplied in a predetermined ratio to a mixer/dispenser where they are intermixed with one another and dispensed onto a substrate. In such a system, if too much of one component is applied, then the characteristics of the combined materials are undesirably altered. It is therefore important that the ratio of the components of two-component mixing and dispensing systems be exactly maintained. This ratio is particularly difficult to maintain when the materials are supplied to a dispenser which is intermittent in operation, i.e., which is repeatedly turned on and off. In such applications, loss of ratio control characteristically occurs for a few seconds shortly after the dispenser is opened. During that first few seconds after opening of the dispenser, a transient imbalance phenomena occurs caused by the elasticity in the system and the changing hydraulic pressures associated with cycling the dispenser.

Another problem which may occur in intermittent operations is a loss of flow control of the resulting mixture of the two components. It is desirous to control the flow rate of the resulting mixture dispensed to the substrate. However, during the first few seconds after opening of the dispenser, the transient imbalance phenomena described above may result in a loss of control of the flow rate of the mixture. If the mixture is an adhesive, this may result in less adhesive being applied to the substrate which, in turn, may affect the bonding of materials. This loss of flow control can occur separately or in addition to the loss of ratio control. In other words, even if the ratio control is not lost after the opening of the dispenser, the flow control may be lost. Therefore, it is desirous to control both the ratio of the components of mixing and the flow rate of dispensing of the resulting mixture.

Two-component liquid, mixing, and dispensing systems conventionally comprise a source for each component connected through metering pumps to the dispenser. Either immediately before the dispenser or at the dispenser, the two components are combined and mixed. In the steady state flow condition of the system, the volumetric ratio of the two components dispensed from the system is controlled by the metering pumps. The exact ratio, though, may be measured as a function of the pressure of the two materials at the dispenser. This pressure results not only from (1) pressure created by the metering pumps, but also from (2) the rate of flow of the materials between the metering pump and the dispenser, and (3) the hydraulic flow restrictions contained between the metering pump and the dispenser. Since pressure is dependent on flow, it changes as the dispenser is cycled, and the flow path changes. All systems, and particularly those in which the dispenser is connected to the metering pumps by flexible hoses, have some resiliency in the hydraulic system. As a consequence, when the hydraulic pressure changes, the volume of stored material between the dispenser and the metering pump changes. When the valve of the dispenser is subsequently opened, an incorrect ratio condition and/or an incorrect flow rate occurs until the inlet pressure at the dispenser of both components reaches equilibrium or steady state flow pressure. Maintenance of a desired ratio of the two components of a two-component system therefore requires that the pressure of each component of the system at the dispenser be adjusted and controlled, not only during the steady state flow condition of the system, but also during the first few seconds after opening of the dispenser valve.

It has therefore been one objective of this invention to provide a two-component mixing and dispensing system which maintains a volumetric or mass relationship between the two components when the system is operated intermittently, both during start-up of flow and during the steady state flow condition.

Another objective of this invention has been to provide a two-component dispensing system which compensates for or eliminates flow and ratio transients which customarily occur in an intermittently operated, two-component mixing and dispensing system immediately after opening of the dispensing valve(s) of the system.

But precise maintenance of a desired ratio of the two components of a two-component mixing and dispensing system requires more than that the pressure of each liquid component at the dispenser be adjusted and controlled. Specifically, it further requires that the ratio of the two components be exactly maintained. In the case of polymeric materials which chemically react with one another, this ratio is determined by the weight or mass of the two component materials. But the two-component materials are generally supplied to the dispenser by volumetric metering pumps, and those volumetric metering pumps, in the absence of appropriate controls, control the volumetric ratio of the two components, rather than the weight or mass ratio. The volumetric ratio fails to account for any changes in density and resulting changes in mass such as occurs whenever there is a temperature change of the materials. Thus, in a volumetric controlled system, changes in temperature of the individual components being mixed, introduces an error in the relative mass ratio between the two components. Otherwise expressed, if the system maintains a fixed volume ratio of two components and the density or specific gravity of one or both components changes, an error is introduced into the weight or mass ratio of the two components. And it is the weight or mass ratio which must be maintained in a two-component mixing and dispensing system wherein the two components chemically react with one another when combined.

It has, therefore, been another objective of this invention to provide a two-component mixing and dispensing system which maintains a fixed ratio of mass of the two components even if and during density or specific gravity changes of one or both of the components.

Density changes of polymeric materials of the type with which this invention is primarily concerned, generally result from temperature changes. It has, therefore, been another objective of this invention to provide a two-component mixing and dispensing system which compensates for mass or weight per unit of volume changes which result from temperature changes in one or both of the components and is operable to maintain a fixed mass ratio of the two components in spite of and during any such temperature and resulting density changes.

Another parameter which must generally be accurately controlled and maintained in a two-component mixing and dispensing system is the volumetric output of the combined component materials dispensed from the dispenser. This output may be expressed as a volumetric output flow rate or as a mass output flow rate. But in either event, whether expressed as a constant volumetric output flow rate or a mass output flow rate, it must, in most applications, be maintained constant. It has, therefore, been another objective of this invention to provide a two-component mixing and dispensing system wherein the volumetric output flow rate from the dispenser or the mass output flow rate from the dispenser is maintained constant while simultaneously the mass ratio of components supplied to the dispenser is maintained constant.

The "mass ratio" of one component relative to another component of a two-component mixing and dispensing system is the same ratio as the mass flow rate to the dispenser of one component relative to the mass flow rate to the dispenser of the other component. As the mass flow rate of one component to the dispenser changes, relative to the mass flow rate of the other component to the dispenser, so does the "mass ratio" of the two components change in the same ratio. Otherwise expressed, the "mass ratio" of two components supplied to a mixing and dispensing system is the same ratio as the mass flow rate of that one component relative to the mass flow rate of the other component.

SUMMARY OF THE INVENTION

In order to achieve these objectives and in accordance with one embodiment of this invention, a back pressure control means is interposed between the intermittently operable dispenser and the pressurized source of each component of liquid material to the dispenser. This back pressure control means comprises a bypass flow path around each metering pump and an adjustable pressure regulator means (which may be in the form of an adjustable flow restrictor or an adjustable pressure regulator valve) contained in that bypass path. Additionally, each bypass flow path includes a flow control valve that is closed when the dispenser flow control valve is open and vice versa. The adjustable pressure regulator means in each bypass flow path may be operated either manually or automatically. If adjusted manually, the adjustable pressure regulator means is adjusted so as to make the pressure at the inlet to the gun when the flow control valve is closed equal to or a function of the steady state flow pressure at the inlet to the gun when the valve is open. If adjusted automatically, the pressure regulator means is connected in a closed loop control circuit with, for example, a computer, which controls adjustment of the pressure regulator means to a position such that the inlet pressure to the dispenser in the preceding steady state flow cycle is used as a reference point for setting the pressure regulator means to maintain the inlet pressure to the dispenser at that same pressure or a function thereof when the dispenser flow control valve is closed.

Each metering pump is individually operated and controlled, so that the volumetric ratio of the two materials may be varied by simply changing the speed, and thus the volumetric output or flow rate of one or both metering pumps. In accordance with the practice of this invention, the temperature of each component is monitored and the speed of each metering pump is adjusted, so as to maintain a fixed mass through-put or mass flow rate of component material through each metering pump. Otherwise expressed, as the temperature of the material passing through each metering pump changes, the density changes accordingly and in accordance with a known relationship between temperature and density for each component material. Since mass is equal to volume times density times a constant, the mass through-put by one metering pump is maintained constant as the temperature of material passing through the pump changes by adjusting the speed of the metering pump according to the temperature changes. That is, for example, if the density of one component of the two-component system decreases by two percent in response to a 20° C. increase in temperature of the material, then the mass flow rate of material through that material's metering pump can be maintained constant by increasing the speed of the pump by an amount which effects a two percent increase in the volume or material displaced through the pump. In this way, and by monitoring the temperature of each of the two components of the system, the speeds of the metering pumps may be adjusted to maintain a fixed mass ratio of the two components of the system.

The primary advantage of the invention of this application is that it very simply and inexpensively eliminates the volumetric ratio and/or flow rate changes or transients which normally occur in a two-component mixing and dispensing system whenever the dispenser is operated intermittently.

Another advantage of the invention of this application is that it enables the mass ratio (and mass ratio flow rate) of a two-component mixing and dispensing system to be maintained as changes occur in the temperature of the individual components in the system. Prior to this invention, small temperature changes would have disturbed and upset the mass or weight ratio of the two components, and, in many instances, adversely affected the mass output flow rate of mixed components dispensed from the system, as well as the properties of the resulting mixed components dispensed from the system.

DESCRIPTION OF THE DRAWINGS

These and other objects and advantages of this invention will become apparent from the following description of the drawing in which.

DESCRIPTION OF THE PREFERRED EMBODIMENT OF THE INVENTION

Figure 1:
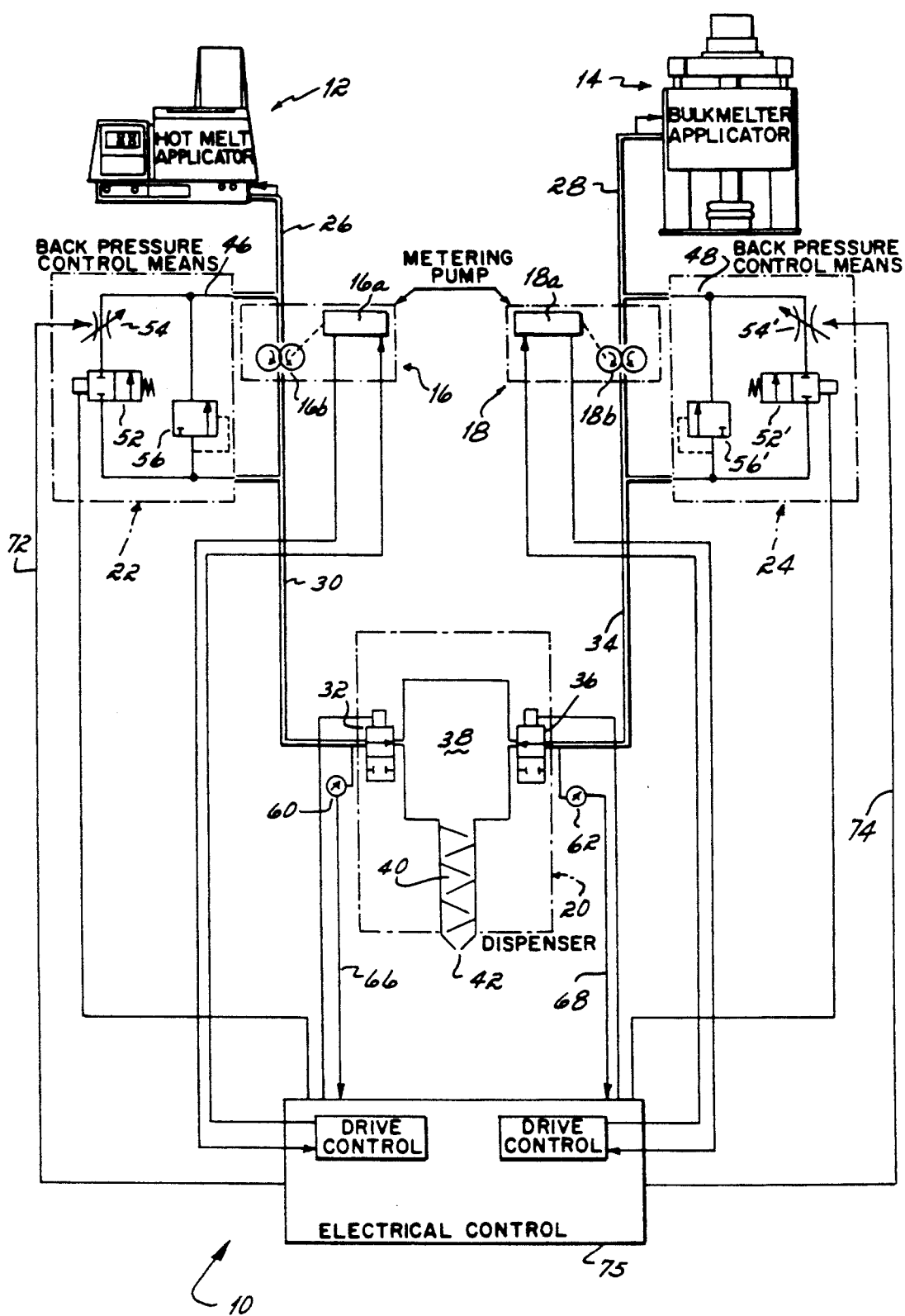
FIG. 1 is a diagrammatic illustration of a two-component mixing and dispensing system embodying the invention of this application.

With reference to FIG. 1, there is illustrated one embodiment of a two-component system for mixing and dispensing two different materials, such as two different hot-melt polymeric materials. Hot-melt materials are those materials which are solid at room or ambient temperature but which, upon application of heat, can be converted to the liquid state. When dispensed at ambient temperature, molten hot-melt materials quickly return to the solid state. The two-component hot-melt system described herein is particularly suited to the application of a two-component hot-melt adhesive such as manufactured by H. B. Fuller Company or The Union Camp Co. Two such compounds manufactured by H. B. Fuller Company are identified as HL-9601-B and HL9602-A. This system could as well, though, be utilized for mixing and dispensing cold materials and materials other than adhesives, as for example, paints or gasket or caulking materials. Additionally, the system may be used to dispense hot-melt solid or foam materials.

The two-component mixing and dispensing system 10 comprises two hot-melt applicators 12 and 14, two metering pumps 16 and 18, and a dispenser 20. Additionally, there is associated with each metering pump 16 and 18 a back pressure control means 22, 24, respectively.

In this embodiment of the invention, the hot-melt applicators 12 and 14 are two different types of applicators because of the different volumes of material which each is required to melt and pump to the metering pumps 16 and 18 via the interconnecting conduits 26 and 28, respectively. The hot melt applicator 12 is operative to melt and supply under pressure from a pump contained internally of the applicator a first polymeric material which is utilized in less volume than the component supplied from the bulk hot-melt applicator 14. One hot-melt applicator 12 suitable for melting and pumping to the system the smaller volume polymeric component of this application is completely disclosed in U.S. Pat. No. 3,964,645 issued Jun. 22, 1976 and assigned to the assignee of this application. Similarly, a bulk melter 14 suitable for melting and supplying under pressure the main or high volume polymeric component utilized in this application is completely disclosed in U.S. Pat. No. 4,073,409 issued Feb. 14, 1978.

The metering pumps 16 and 18 may be gear-type, motor-driven pumps operative to supply molten polymeric material via the conduits 26 and 28, respectively, to the dispenser 20. The volume at which each component is supplied to the dispenser is controlled by the speed of the variable-speed motors 16a, 18a utilized to drive the gear 16b, 18b of the pumps 16 and 18, respectively. The metering pumps are coupled or linked electrically such that the ratio of the volume or mass dispensed from one metering pump is in proportion to the volume or mass dispensed from the other one. From the gear pump 16, the molten polymeric material derived from the hot-melt applicator 12 is supplied to the dispenser 20 via a conduit 30 through an air-operated solenoid valve 32 of the dispenser 20. Similarly, from the metering pump 18, the main or high-volume polymeric material is supplied via a conduit 34 to another air-operated solenoid valve 36 of the dispenser 20. These valves 32 and 36 in turn are individually operable to control the flow of the two different components into a mixing chamber 38 of the dispenser where the two different materials are for the first time combined. From the mixing chamber, the two materials flow through conventional static mixer 40 of the type which is operative to repeatedly divide and recombine the mixture in the course of passage through the mixer such that by the time the two components reach the discharge orifice 42 of the dispenser 20, the two components have been thoroughly mixed. Of course, the chemical reaction between the two polymeric materials which occurs upon combination of the two is occurring in the course of passage through the mixer and continues after the components are dispensed from the outlet 42 thereof.

Each back pressure control means 22, 24 includes a bypass flow path 46, 48 around the gear pump 16, 18 with which it is associated. This bypass flow path comprises a flow conduit extending from the discharge side of the gear pump and its conduit 30, 34 to the input side of the gear pump and its input conduit 26, 28. Included in this flow path is a pneumatically operated flow control valve 52, 52' and an adjustable pressure regulator means 54, 54' connected in series in the bypass flow path. The adjustable pressure regulator means may take the form of a simple adjustable needle valve forming an adjustable restrictor in the bypass flow path 46, 48 or it may take the form of an adjustable pressure regulator valve. As explained more fully hereinafter, the function of this adjustable pressure regulator means 54, 54' is to regulate and control the back pressure in the bypass flow path 46, 48 when the flow control valves 52, 52' are open.

Additionally, each bypass flow path 46, 48 includes an overload pressure regulator in the form of a pressure relief valve 56, 56' connected in parallel with the flow control valve 52, 52' and adjustable pressure control means 54, 54'. The function of the overload pressure relief valve 56, 56' is to bypass liquid from the discharge side of the metering pump to the inlet side in the event that the pressure on the discharge side of the metering pump exceeds a preset pressure substantially above the operating pressure at which the particular component is to be supplied from the applicator 12 or 14 to the dispenser 20.

Air pressure is supplied alternatively to the air-pressure-operated solenoids 32, 36 of the dispenser 20 and the pneumatically operated flow control valves 52, 52' of the back pressure control means 22 and 24. That is, when air pressure is supplied to the solenoids 32, 34 of the dispenser so as to cause those valves to open and permit flow of liquid to the mixing chamber 38 of the dispenser, the flow control valves 52, 52' of the manifolds 22 and 24 are closed. Alternatively, when the flow control valves 52, 52' are open such that liquid can flow through the bypass flow paths, the solenoids 32, 36 are closed, and flow of liquid to the mixing chamber 38 is shut off.

In the operation of the system 10 illustrated in FIG. 1, the first or smaller volume component polymeric material is supplied in solid form to the hot-melt applicator 12. In this example, this component is referred to as the smaller volume component but it could obviously be supplied at the same volume as the second component and still be within the practice of this invention. In the applicator 12, this material is melted and converted from the solid to the liquid state. This liquid smaller volume component, or component No. 1, is supplied via a pump contained in the applicator 12 under pressure to the metering pump 16. The metering pump is operative to supply the molten liquid component No. 1 at a desired flow rate to the discharge side of the metering pump. Assuming that the flow control valve 32 of the dispenser 20 is closed, the output flow from the metering pump 16 is routed via the now open flow control valve 52 and pressure regulator means 54 in the bypass flow path 46, back to the input side of the gear pump 16. This bypass flow of component No. 1 will continue until the dispenser flow control valve 32 is opened. Similarly, the high volume or main component, component No. 2 solid material is melted by the bulk hot-melt applicator 14 and is supplied under pressure from a pump contained internally of the bulk melter 14 to the metering pump 18. So long as the flow control valve 36 of the dispenser remains closed, that material continues to flow through the metering pump 18 and then through the bypass flow path 48, through the open flow control valve 52' and the pressure regulator means 54' back to the input side of the metering pump 18. When the flow control valves 32, 36 of the dispenser are opened, the flow control valves 52, 52' in the bypass flow paths around the metering pumps are simultaneously closed. Thereby, each component is permitted to flow from the metering pump via the conduits 30, 34 into the mixing chamber 38 of the dispenser 20 and through the mixer 40 to the discharge orifice 42 of the dispenser.

In accordance with the practice of one embodiment of this invention, the pressure of the smaller volume component No. 1 at the input side of the dispenser 20 is in the steady state flow condition of the dispenser when the two components are being mixed and dispensed through the dispenser 20. When the flow control valves 32, 36 of the dispenser 20 are closed and the flow control valves 52, 52' are open, the pressure regulator means 54, 54' are adjusted so as to maintain the pressure at the inlet to the dispenser at about the same pressure as was recorded by pressure transducer and/or pressure readout gauges 60, 62 on the input sides of the dispenser 20 in the steady state flow condition, i.e., when the flow control valves 32, 36 of the dispenser were open and the flow control valves 52, 52' were closed.

In practice, the pressure regulator means 54, 54' may be either manually set and operated, or they may be automatically adjusted. If set manually, they will be adjusted so as to maintain a fixed pressure at the inlet side of the dispenser 20 (as read on pressure gauges or pressure transducers 60, 62) when the flow control valves 32, 36 of the dispenser are opened and the flow control valves 52, 52' of the back pressure control means 22, 24 are closed and vice versa. Alternatively, if operated automatically, the adjustable pressure regulator means 54, 54' may be adjusted by utilizing a closed loop control circuit, including a computer or programmable controller as part of the electrical control 75, to manipulate the adjustment of the pressure regulator means 54, 54' so as to maintain the input pressure to the dispenser at about the same pressure after closing of the dispensing flow control valves 32, 36 as prevailed immediately prior to the closing of the flow control valves 32, 34. Preferably, in such an automatic control, the steady state pressure is determined for each cycle and the valves 54, 54' adjusted accordingly. This can be accomplished by utilizing pressure transducers for the gauges 60, 62 to provide input signals via lines (not shown) to the electrical control 75. The pressure settings of the pressure regulator means 54, 54' may then be adjusted by the electrical control 75 acting on the pressure control means 54, 54' by signals transmitted via leads 72, 74.

Thus, the pressure reading at the pressure gauge or transducer 60 located at the inlet to the dispenser will be substantially the same pressure in both conditions of the dispenser, i.e., when the dispenser is operated so as to permit the two components to flow through the dispenser and when the flow control valves of the dispenser are closed and there is no material flowing through the dispenser. Similarly, the pressure reading at the pressure transducer or gauge 62 located at the inlet to the dispenser will read substantially the same pressure in both conditions of the dispenser 20, i.e., when the dispenser is operated so as to permit the two components to flow through the dispenser and when the flow control valves of the dispenser are closed and there is no material flowing through the dispenser.

Figure 2:
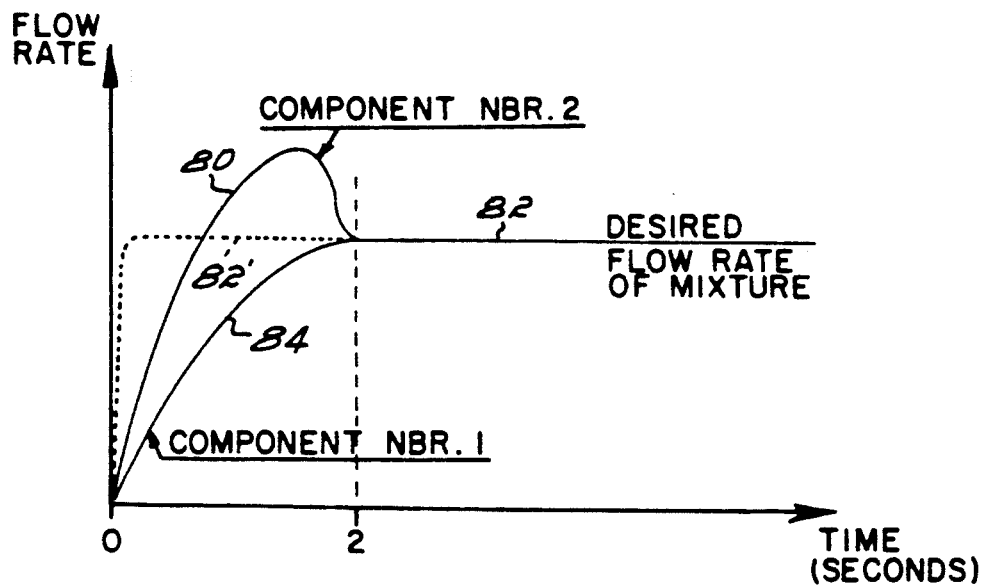
FIG. 2 is a chart of flow vs. time of a prior art, two-component mixing and dispensing system not incorporating a back pressure control means.

With reference now to FIG. 2, there is illustrated a flow vs. time chart which illustrates in solid lines the condition which obtains in the prior art when prior art dispensing systems are operated without the back pressure control means 22, 24 of this invention, and specifically without the bypass flow paths 46, 48, including the flow control valves 52, 52' and adjustable pressure regulator means 54, 54'. Assuming that the flow control valves 32, 36 of the dispenser 20 initially opened at time equal to zero, the flow of component No. 2, immediately climbs to a flow rate 80 substantially above the desired flow rate 82, 82'. This is because the pressure on the input side of the dispenser 20 builds up, with the valves 32, 36 closed, and the metering pumps continuing to run, to a pressure substantially above the steady state flow rate pressure. After a certain length of time, such as approximately two seconds, the flow of the main component or high-volume component settles down to the desired flow rate 82. In the meantime, because the second component No. 1 enters the mixing chamber 38 at a lesser pressure than component No. 2, the entry of that component is partially blocked by the excessive pressure of the other component No. 1. Therefore, the flow 84 of that second component No. 1 is retarded by the excessive pressure of component No. 2 until such time as component No. 2 settles down to its desired steady state flow rate. Only at that time does the component No. 1 flow rate move up to the desired flow rate 82. In the meantime, the ratio of component No. 2 to component No. 1 is substantially different from the desired ratio. Assuming component No. 1 is a hardener, the resulting product dispensed during this first two seconds would contain too little hardener with the result that the main component would take an excessively long time to harden after application to a substrate. In high-volume, high-production situations, with repeated cycling, this incorrect ratio of the two components can create unacceptable production problems.

Figure 3:
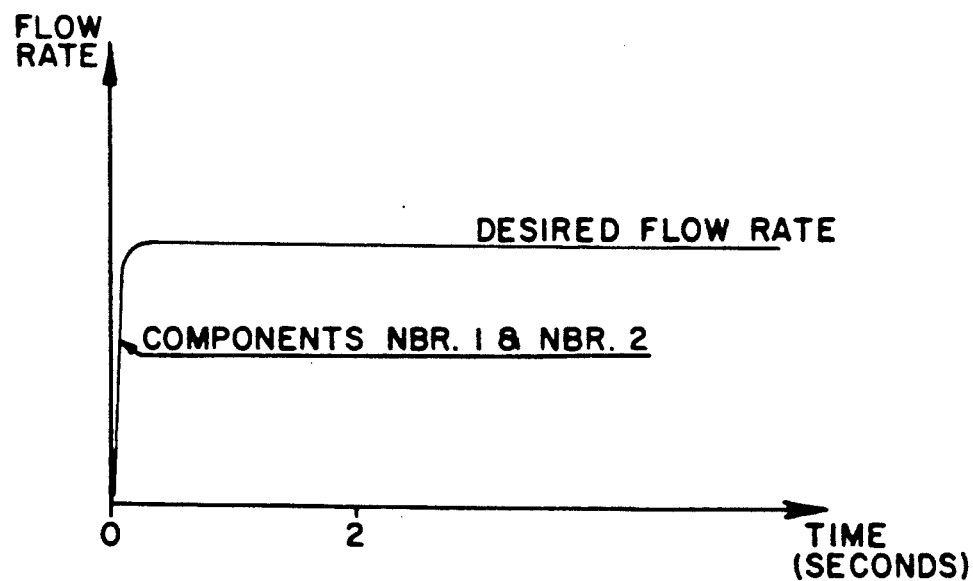
FIG. 3 is a chart like that of FIG. 2 but of a two-component system incorporating a back pressure control means and incorporating the invention of this application.

With reference now to FIG. 3, it will be seen that when the invention of this application, including the back pressure control means 22, 24, are utilized as part of the system, the desired flows of both components are almost instantaneously achieved after the valves 32, 36 are opened and the valves 52, 52' closed. Thereby, improper ratios of the two components are substantially completely precluded from being dispensed from the dispenser 20 of this system.

It has been further determined that, in some applications, it is preferable to set the pressures at the inlet of the dispenser to a predetermined multiple or function of the pressure of the steady state condition. This is believed to be due in part to the compliancy of the system, i.e., the expansion of hoses, entrapped air bubbles, the properties of the material, and other variables. In such an embodiment, one pressure regular means 54 may be adjusted to maintain a pressure of, for example, 1.1 times that of the steady state pressure, while the other 54' may be set at, for example, 0.9 times the steady state pressure. The optimum settings may be determined empirically and may vary somewhat from one mixer to another and from one material to another.

As the system ages, wears or clogs, it may be desirable to change the multiplier applied to the reference or steady state pressure to determine the transient or off pressure in order to optimize the system. For example, when the system is clean, a multiplier may be set at 1.1. One hour later, it may be better set at 1.2. After two hours, it may be better set at 1.4. Therefore, a look-up table can be generated empirically for a given material and mixer type, and stored in memory within the control 75, which allows for different or varying multipliers to be applied to the reference or steady state pressure. In order to eliminate the empirical measurements needed to generate a look-up table, the system can be mathematically modeled to produce a calculated look-up table or to calculate the next pressure setting of each cycle based on on-line measured values, such as input flow, temperature, pressure, or other parameters.

As mentioned hereinabove, it is important to maintain the mass ratio of two components of a two-component mixing and dispensing system in order to have the resulting mixed components have the desired properties. In the case of paint, this may be a color or a drying time, or in the case of an adhesive, this may be a desired adhesive property and cure time. Since mass, though, is a function of volume and density, and since density is a function of temperature, the volume of materials supplied to the dispenser by the metering pumps 16 and 18 must be varied in accordance with the temperature of the components if a fixed mass ratio between the two-component materials is to be maintained.

For example, if the temperature of the materials supplied by metering pump 16 changes in temperature by 30° C., and if this material has specific gravity to temperature properties that will result in a specific gravity change of 2.5 percent, then the control will cause the variable speed motor 16a to vary the speed of the metering pump by that same 2.5 percent in order to maintain the same fixed total mass flow rate of materials dispensed from the dispenser 20.

To maintain the fixed mass flow rate through the pumps 16, 18 temperature measuring devices 64, 66, such as for example a thermocouple or a RTD, are provided for utilization in a closed loop control circuit. It is preferred that a temperature measuring device 64, 66 is located within each metering pump to provide an electrical signal indicative of the temperature of the liquid component material contained within the pump. The signals are furnished via leads 69, 71 to the electrical control 75 which may contain a computer or programmable controller. The electrical control 75 also includes drive controls 68 and 70, such as SCR drives, for controlling the speed of the motors 16a and 16b. In response to the temperature signals on levels 69, 71, the electrical control 75 provides signals to the respective drive control 68, 70 which, in turn, adjust the speed of the motors 16a, 16b accordingly.

Assuming the electrical control 75 contains a computer, the computer is programmed to determine the volumetric and/or mass flow rates of a component as a function of the temperature received from one or both of the temperature measuring devices. If the computer determines that the change in temperature has affected the mass ratio or mass flow rate of a component, the computer will provide signals to adjust the speed of the motors 16a and 16b. For example, the total volumetric flow rate (Fv) of material dispensed from the dispenser is equal to the sum of the volumetric flow rate of the first component material (Fv$_1$) plus the volumetric flow rate of the second component material (Fv$_2$). Also, the mass flow rate (Fm$_1$, Fm$_2$) of each component material is equal to the respective volumetric flow rate (Fv$_1$, Fv$_2$) times its specific gravity (SG$_1$, SG$_2$). Therefore, the volumetric flow rate of each component material can be determined from the following equations:

$$Fv_1 = \frac{Fv}{1 + Rm(SG_1/SG_2)} \text{ ; and} \qquad 1)$$

$$Fv_2 = \frac{Fv}{1 + SG_2/(Rm\ SG_1)} \text{ ; or} \qquad 2)$$

$$Fv_2 = Fv - Fv_1 \text{; where } Rm \text{ is the mass ratio.} \qquad 3)$$

As is known, the specific gravity of materials is temperature dependent. Therefore, for a given component material the computer can either calculate or use a look-up table to determine the specific gravity (SG$_1$, SG$_2$) at various temperatures sensed by the temperature sensing devices.

The mass ratio (Rm) is the desired mass ratio of the components involved for the specific application. This term then is a constant for a given application.

In like manner, the total volumetric flow rate (Fv) is the desired volumetric flow rate for a specific application. This term then is also a constant for a given application.

Therefore, the variables of the volumetric flow rate (Fv$_1$, Fv$_2$) for each component are the specific gravities (SG$_1$, SG$_2$) which are temperature dependent. If the temperature of the first component increases, the specific gravity (SG$_1$) will decrease requiring the volumetric flow rate of pump 16 to be increased in order to satisfy equation 1, where the mass ratio and the total volumetric flow rate are constant. After the new flow rate (Fv$_1$) has been calculated, the computer will provide signals to the drive control 68 which increases the speed of the motor 16a and, in turn, the pump 16b.

A change in the specific gravity of one component will require a change in the other components' volumetric flow rate because the specific gravity (SG$_1$, SG$_2$) of both components is found in both volumetric flow rate equations. Therefore, in the above example, if the specific gravity (SG$_1$) of the first component decreases, this will result in a decrease in the volumetric flow rate (Fv$_2$) of the second component. The computer will then provide signals to the drive control 70 which decreases the speed of the motor 18a and, in turn, the pump 18b which produces a flow rate equal to the newly calculated (Fv$_2$).

As is readily apparent, if both the mass flow rate (Rm) and the total volumetric flow (Fv) discharged from the dispenser is to remain constant, a change in the volumetric flow rate (Fv$_1$, Fv$_2$) of one component produces an increase/decrease in the operation of the respective metering pump (16, 18) and a decrease/increase to the other metering pump.

In a similar manner, a control system could be utilized in which the total mass output flow rate (Fm) is held constant, instead of the total volumetric flow rate (Fv), as the mass ratio is held constant. The volumetric flow rate of each component material can then be determined from the following equations:

$$Fv_1 = \frac{Fm}{SG_1 (1 + 1/Rm)} ; \text{ and}$$

$$Fv_2 = \frac{Fm}{SG_2 (Rm + 1)}$$

In this embodiment, a variation of the specific gravity of one component does not require a corresponding change in the volumetric flow rate of the other component. Therefore, maintaining a constant total mass output flow rate and a constant mass ratio produces a simplified control because a change in the specific gravity of one component produces a change in speed of only the respective pump for that one component.

While only a limited number of preferred embodiments of the invention have been described, persons skilled in the art to which it applies will readily appreciate changes and modifications which may be made without departing from the spirit of the invention. Obviously, the invention may be used in systems for applying ambient temperature materials, as well as for applying hot-melt materials. Other changes and modifications will be readily apparent to persons skilled in this art. Therefore, the invention is not intended to be limited except by the scope of the following appended claims:

We claim:

1. A mixing and dispensing system for mixing and dispensing at least two different polymeric materials which react chemically with one another when combined, said system comprising
    a dispenser having a plurality of liquid flow inlets and an outlet,
    first and second pump means for supplying a different liquid polymeric material to each of said liquid flow inlets of said dispenser at a steady state flow and a steady state pressure;
    control means for controlling the pressure of at least one of said liquid materials at one of said inlets of said dispenser when said steady state flow of said materials through said dispenser is terminated as a predetermined function of said steady state pressure which was maintained during said steady state flow of both said materials through said dispenser, said control means including a bypass flow path around at least one of said first and second pump means and an adjustable pressure regulator means for regulating the pressure in said bypass flow path.

2. The system of claim 1 in wherein said control means is operable to maintain the inlet pressure of at least two of said different liquid materials at said dispenser after the flow of materials through said dispenser is terminated as a predetermined function of said steady state pressure which was maintained at said dispenser when said materials were flowing through said dispenser.

3. A two-component mixing and dispensing system for mixing and dispensing two different polymeric materials which react chemically with one another when combined, said system comprising
    a two-component dispenser having a pair of liquid flow inlets and a single outlet,
    first supply means including a first metering pump for supplying a first liquid polymeric material to one of said liquid flow inlets of said dispenser at a first pressure;
    second supply means including a second metering pump for supplying a second liquid polymeric material to the other of said liquid flow inlets of said dispenser at a second pressure, and
    control means for controlling said first pressure of at least said first liquid supply to said one of said inlets of said dispenser, both when said materials are flowing through said dispenser and when said flow of materials through said dispenser is terminated, so that upon and subsequent to startup of flow of said liquid materials through said dispenser the volume of said first liquid material flowing through said dispenser remains substantially constant at a predetermined flow rate, said control means including a bypass flow path around flow rate, said control means including a bypass flow path around said first metering pump and an adjustable pressure regulator means for regulating the pressure in said bypass flow path.

4. A two-component mixing and dispensing system for mixing and dispensing two different polymeric materials which react chemically with one another when combined, said system comprising
    a two-component dispenser having a pair of liquid flow inlets and a single outlet,
    first supply means including a first metering pump for supplying a first pressurized, liquid polymeric material to one of said liquid flow inlets of said dispenser,
    second supply means including a second metering pump for supplying a second pressurized, liquid polymeric material to the other of said liquid flow inlets of said dispenser, and
    contol means for maintaining the flow rate of at least said first liquid downstream of said first metering pump at a predetermined flow rate both when said materials are flowing through said dispenser and when said flow of materials through said dispenser is terminated so that upon and subsequent to startup of flow of said liquid materials through said dispenser, the volume of said first liquid material flowing through said dispenser remains substantially constant, said control means including a bypass flow path around said first metering pump and an adjustable pressure regulator means for regulating the pressure in said bypas flow path.

5. A two-component mixing and dispensing system for mixing two different polymeric materials which react chemically with one another when combined and for dispensing a resultant mixture thereof, which system comprises:
    a two-component dispenser,
    first supply means for supplying a first liquid polymeric material to said dispenser at a first pressure, said first supply means including a first source of said first material and first conduit means for interconnecting said first source to said dispenser, said first conduit means further including a first metering pump for supplying measured quantities of said first material through said first conduit means to said dispenser,
    second supply means for supplying a second liquid polymeric material to said dispenser at a second pressure, said second supply means including a second source of said second material and second conduit means for interconnecting said second source to said dispenser, said second conduit means further including a second metering pump for supplying measured quantities of said second material through said second conduit means to said dispenser, and pressure control means, operable when the flow of materials through said dispenser is terminated, for controlling the pressure at which at least the first pressurized liquid material is supplied to said dispenser as a function of the pressure when said liquid materials are flowing through said dispenser, said pressure control means including a bypass flow path around said first metering pump and an adjustable pressure regulator means for regulating the pressure in said bypass flow path.

6. The system of claim 5 wherein said pressure control means is operable to maintain the inlet pressure of both said first and second liquid materials at substantially constant predetermined flow pressures both when said liquid materials are flowing through said dispenser and when said flow of materials through said dispenser is terminated.

7. The system of claim 5 in which said pressure control means includes bypass flow paths around each of said first and second metering pumps, and an adjustable pressure regulator means in each of said bypass flow paths.

8. The system of claim 7 wherein each supply means further includes a first flow control valve connected to one of said conduit means; and wherein said pressure control means further includes a second flow control valve in each bypass flow path and a means for alternating opening said respective first and second flow control valves so that flow is routed through said each bypass flow path and around each of said metering pumps when said first flow control valves are closed and said second flow control valves are opened and flow is routed to said first flow control valve and through said dispenser when said first flow control valves are opened and said second flow control valves are closed.

9. The system of claim 5 wherein the first supply means further includes a first flow control valve connected to said first conduit means;

said bypass flow path including a second flow control valve; and means for alternating opening said first and second flow control valves so that flow is routed through said bypass flow path and around said metering pump when said first flow control valve is opened and said second flow control valve is closed and flow is routed to said first flow control valve and through said dispenser when said first flow control valve is opened and said second flow control valve is closed.

10. The system of claim 6 wherein said pressure control means is operable to maintain substantially constant the entering pressure of both said first and second liquid materials at said dispensers both when the flow of liquid materials through said dispenser is stopped, as well as during the steady state flow condition of liquid materials through said dispenser.

11. A method of mixing and dispensing different polymeric materials which react chemically with one another when combined, which method comprises:

supplying a first pressurized liquid polymeric material to said dispenser, supplying a second pressurized liquid polymeric material to said dispenser, intermittently starting and stopping the flow of said materials from said dispenser, and controlling the supply of at least one of said liquid materials to said dispenser so that said at least one liquid material flows at a steady state flow pressure when said materials are flowing through said dispenser and at an adjustably regulated pressure which is determined by an adjustable pressure regulator contained in a bypass flow path for said at least one liquid material and is a predetermined function of said steady state flow pressure when said flow of materials through said dispenser is terminated.

12. A method of mixing and dispensing different polymeric materials which react chemically with one another when combined, which method comprises:

supplying a first pressurized liquid polymeric material to a dispenser, supplying a second pressurized liquid polymeric material to said dispenser, intermittently starting and stopping the flow of said materials from said dispenser, and controlling the steady state flow pressures at which both said first and second liquid materials are inlet to said dispenser when said liquid materials are flowing through said dispenser, and controlling the inlet pressure of each of said first and second materials by adjustably regulating each inlet pressure to a pressure which is determined by adjustable pressure regulators contained in bypass flow paths for said first and second liquid materials and is a predetermined function of said steady state flow pressures when said flow of materials through said dispenser is terminated.

13. A method of mixing and dispensing comprising the steps of:

a) intermittently dispensing a mixture of a first and second pressurized liquid polymeric material from an outlet of a dispenser;

a) intermittently dispensing a mixture of a first and second pressurized liquid polymeric material from an outlet of a dispenser;

b) determining a steady state inlet pressure for each liquid polymeric material to the dispenser when said mixture is dispensing under steady state flow conditions; and c) adjustably regulating an off inlet pressure as a function of the respective steady state inlet pressures of each liquid polymeric material when said mixture is not being dispensed from the dispenser by directing said first and second liquid polymeric materials through respective first and second bypass flow paths each including an adjustable pressure regulator.

14. The method of claim 13 wherein the off inlet pressure of each liquid polymeric material of step (c) is substantially equal to the respective steady state inlet pressure.

15. The method of claim 13 wherein the inlet pressure of each liquid polymeric material of step (c) is a multiple of the respective steady state inlet pressure.

16. The method of claim 15 wherein the inlet pressure of each liquid is within the range of 0.7 and 1.3 times the respective steady inlet pressure.

17. A method for mixing and dispensing different polymeric materials comprising the steps of:
  a) dispensing a resultant mixture of a first and second liquid polymeric material while maintaining a respective first supply pressure for each liquid polymeric material;
  b) determining a respective second supply pressure for each liquid polymeric material in a predetermined relationship to the respective first supply pressure for each liquid polymeric material;
  c) adjustably regulating said second supply pressure of at least one of said first and second liquid polymeric materials to a second supply pressure different from said first supply pressure of said one of said first and second liquid polymeric materials by directing said one of said first and second liquid polymeric materials through a bypass flow path including an adjustable pressure regulator;
  d) stopping the dispensing of the resultant mixture while maintaining respective second supply pressures and;
  e) repeating steps (a) through (d).

18. A mixing and dispensing system for mixing and dispensing at least two different polymeric materials which react chemically with one another when
  a dispenser having a plurality of liquid flow inlets and an outlet,
  supply means for supplying a different pressurized, liquid polymeric material to each of said liquid flow inlets of said dispenser,
  means for maintaining a fixed mass ratio of said liquid materials supplied to said inlets of said dispenser by varying the volume of each material supplied to said inlets in response to temperature changes of said materials.

19. The system of claim 18 wherein said last named means is further operable to control the inlet pressure of each of said liquid materials at said dispenser after the flow of materials through said dispenser is terminated so that said inlet pressures are a predetermined function of the pressure which was maintained at said dispenser when said materials were flowing through said dispenser.

20. A two-component mixing and dispensing system for mixing two different polymeric materials which react chemically with one another when combined, and for dispensing a resultant mixture thereof, said system comprising
  a two-component dispenser having a pair of liquid flow inlets and an outlet,
  first supply means for supplying a first pressurized, liquid polymeric material to one of said liquid flow inlets of said dispenser,
  second supply means for supplying a second pressurized, liquid polymeric material to the other of said liquid flow inlets of said dispenser,
  control means for establishing and controlling the flow rate of said first and second liquid materials supplied to said inlets of said dispenser at a predetermined flow rate during startup of said dispenser, while also maintaining the flow rate of the resulting mixture being dispensed from the outlet of the dispenser at another predetermined flow rate, and
  said control means including means for maintaining a fixed mass ratio of said liquid materials supplied to said inlets of said dispenser by varying the volume of each of said materials supplied to said inlets in response to temperature changes of said respective materials.

21. A two-component mixing and dispensing system for mixing and dispensing two different polymeric materials which react chemically with one another when combined, said system comprising
  a two-component dispenser having a pair of liquid flow inlets and a single outlet,
  first supply means including a first metering pump for supplying a first pressurized, liquid polymeric material to one of said liquid flow inlets of said dispenser,
  second supply means including a second metering pump for supplying a second pressurized, liquid polymeric material to the other of said liquid flow inlets of said dispenser,
  control means for controlling the pressure of at least said first liquid supplied to said one of said inlets of said dispenser, both when said materials are flowing through said dispenser and when said flow of materials through said dispenser is terminated, so that upon and subsequent to startup of flow of said liquid materials through said dispenser the volume of said first liquid material flowing through said dispenser remains substantially constant at a predetermined flow pressure, and
  said control means including means for maintaining a fixed mass ratio of said liquid materials supplied to said inlets of said dispenser by varying the volume of said materials supplied to said inlets in response to temperature changes of said materials.

22. The system of claim 21 wherein said control means is operable to establish and maintain the flow rate of said first liquid material supplied to said one of said inlets at a predetermined flow rate during startup of said dispenser.

23. A two-component mixing and dispensing system for mixing and dispensing two different liquid polymeric materials which react chemically with one another when combined, said system comprising
  a two-component dispenser having a pair of liquid flow inlets and a single outlet,
  first supply means including a first metering pump for supplying a first pressurized, liquid polymeric material to one of said liquid flow inlets of said dispenser,
  second supply means including a second metering pump for supplying a second pressurized, liquid polymeric material to the other of said liquid flow inlets of said dispenser,
  means for maintaining the flow rate of said liquid materials through said metering pumps at predetermined flow rates both when said materials are flowing through said dispenser and when said flow of materials through said dispenser is terminated so that upon and subsequent to startup of flow of said liquid materials through said dispenser, the volume of said first liquid material flowing through said dispenser remains substantially constant, and
  said last named means including means for maintaining a fixed mass ratio of said liquid materials supplied to said inlets of said dispenser by varying the volume of said materials supplied to said inlets in response to temperature changes of said materials.

24. The system of claim 23 wherein said flow rate maintenance means is operable to vary the speed of said metering pumps in response to temperature changes of said materials at said metering pumps.

25. The method of mixing and dispensing two different liquid materials while maintaining a fixed mass ratio of the materials as they are mixed and combined, which materials when combined chemically react with one another, which method comprises,
supplying a first pressurized liquid material to a first metering pump and from the first metering pump to a dispenser,
supplying a second pressurized liquid material to a second metering pump and from the second metering pump to a dispenser,
combining and initiating a chemical reaction of said materials at said dispenser, and
maintaining a fixed mass ratio of said materials supplied to said dispenser by varying the volume of each material supplied to said dispenser by said metering pumps in response to temperature changes of said materials.

26. The method of claim 25 which includes measuring the temperature of said materials at said metering pumps, and
varying the speeds of said pumps in response to temperature measurements at said pumps.

27. The method of mixing and dispensing two different liquid materials while maintaining a fixed mass ratio of the materials as they are mixed and combined, which materials when combined react chemically with one another, which method comprises,
supplying a first pressurized liquid material to a first metering pump and from the first metering pump to a dispenser,
combining and initiating a chemical reaction of said materials,
measuring the temperature of each of said materials, and
varying the speed of said metering pumps in response to changes of temperature of said liquid materials so as to maintain a fixed mass ratio of said materials and a fixed flow rate of said combined materials dispensed from said dispenser.

28. The method of claim 27 wherein said temperature of said liquid materials is measured at said metering pumps.

29. The method of claim 27 wherein said fixed flow rate of said combined materials from said dispenser is a fixed volumetric flow rate.

30. The method of claim 27 wherein said fixed flow rate of combined materials from said dispenser is a fixed volumetric flow rate, and the volumetric flow rate of said first liquid material to said dispenser is determined by the equation $$Fv_1 = \frac{Fv}{1 + Rm(SG_1/SG_2)};$$

and the volumetric flow rate of said second liquid material to said dispenser is determined by the equation $$Fv_2 = \frac{Fv}{1 + SG_2/(Rm\ SG_1)};$$

where Rm is the mass ratio of said liquid materials, Fv is the total volumetric flow rate of both said liquid materials, $Fv_1$ is the volumetric flow rate of said first liquid material, $Fv_2$ is the volumetric flow rate of said second liquid material, $SG_1$ is the specific gravity of said first liquid material, and $SG_2$ is the specific gravity of said second liquid material.

31. The method of claim 27 wherein said fixed flow rate of said combined materials from said dispenser is a fixed mass flow rate.

32. The method of claim 27 wherein said fixed flow rate of said combined materials from said dispenser is a fixed mass flow rate and the volumetric flow rate of said first liquid material to said dispenser is determined by the equation $$Fv_1 = \frac{Fm}{SG_1(1 + 1/Rm)};$$

and the volumetric flow rate of said second liquid material to said dispenser is determined by the equation $$Fv_2 = \frac{Fm}{SG_2(Rm + 1)};$$

where Rm is the mass ratio of said liquid materials, Fm is the total mass output flow rate, $Fv_1$ is the volumetric flow rate of said first liquid material, $Fv_2$ is the volumetric flow rate of said second liquid material, $SG_1$ is the specific gravity of said first liquid material, and $SG_2$ is the specific gravity of said second liquid material.

33. A method of mixing and dispensing different polymeric materials which react chemically with one another when combined, which method comprises
supplying a first pressurized liquid polymeric material via a first metering pump to said dispenser,
supplying a second pressurized liquid polymeric material via a second metering pump to said dispenser,
intermittently starting and stopping the flow of said materials from said dispenser,
controlling the steady state flow pressures at which each of said liquid materials are inlet to said dispenser when said materials are flowing through said dispenser, and controlling the inlet pressure of each of said first and second materials as a predetermined function of said steady state flow pressures when said flow of materials through said dispenser is terminated, and
maintaining a fixed mass ratio of said materials and a fixed flow rate of said combined materials dispensed from said dispenser by varying the speed of said metering pumps in response to a change in temperature of said materials.

34. A method of mixing and dispensing comprising the steps of:
a) supplying first and second pressurized liquid polymeric materials via first and second metering pumps to a dispenser and intermittently dispensing a mixture of said first and second pressurized liquid polymeric materials from an outlet of said dispenser;
b) determining a steady state inlet pressure for each liquid polymeric material to the dispenser when said mixture is dispensing under steady state flow conditions;
c) determining and maintaining an off inlet pressure as a function of the respective steady state inlet pressures of each liquid polymeric material when said mixture is not being dispensed from the dispenser; and
d) maintaining a fixed mass ratio of said materials and a fixed flow rate of said combined materials dispensed from said dispenser by varying the speed of said metering pumps in response to a change in temperature of said materials.

* * * * *

UNITED STATES PATENT AND TRADEMARK OFFICE
CERTIFICATE OF CORRECTION

PATENT NO. : 5,332,125
DATED : July 26, 1994
INVENTOR(S) : James W. Schmitkons et al.

It is certified that error appears in the above-identified patent and that said Letters Patent is hereby corrected as shown below:

Column 6, line 5, "through conventional" should be --through a conventional--.

Column 12, lines 18-19, after "rate," delete "said control means including a bypass flow path around flow rate,".

Column 12, line 38, "contol" should be --control--.

Column 12, line 50, "bypas" should be --bypass--.

Column 14, line 41, please delete "a) intermittently dispensing a mixture of a first and second pressurized liquid polymeric material from an outlet of a dispenser;".

Column 14, line 67, after "liquid" insert --material--.

Column 15, line 25, after "when" insert --combined, said system comprising--.

Signed and Sealed this

Fifteenth Day of November, 1994

Attest:

BRUCE LEHMAN

*Attesting Officer*     *Commissioner of Patents and Trademarks*